(No Model.) 2 Sheets—Sheet 1.

E. THOMSON.
PROCESS OF ELECTRIC WELDING.

No. 434,532. Patented Aug. 19, 1890.

ATTEST:
J. A. Hindle
Thos. F. Coury

INVENTOR:
Elihu Thomson
By H. C. Townsend
Attorney (No Model.) 2 Sheets—Sheet 2.
E. THOMSON.
PROCESS OF ELECTRIC WELDING.
No. 434,532. Patented Aug. 19, 1890.
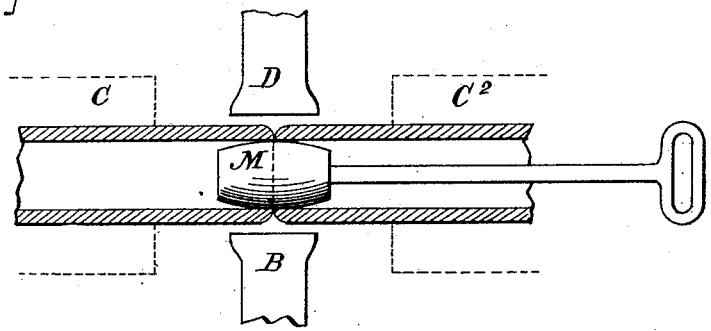
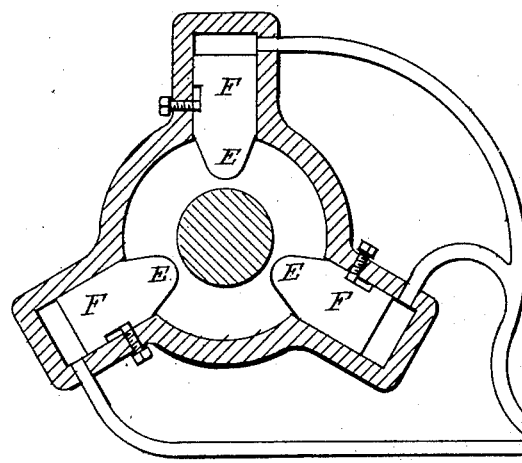
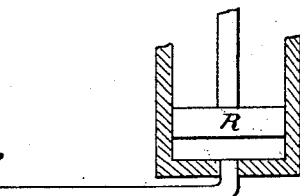
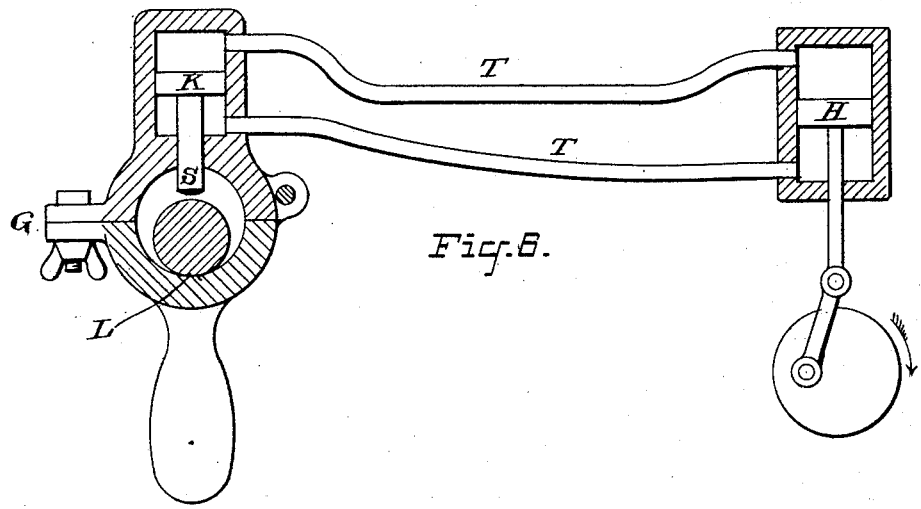
ATTEST:
J. A. Nurdle
Thos. F. Coury.
INVENTOR:
Elihu Thomson
By H. C. Townsend
Attorney

UNITED STATES PATENT OFFICE.

ELIHU THOMSON, OF LYNN, MASSACHUSETTS, ASSIGNOR TO THE THOMSON ELECTRIC WELDING COMPANY, OF MAINE.

PROCESS OF ELECTRIC WELDING.

SPECIFICATION forming part of Letters Patent No. 434,532, dated August 19, 1890.

Application filed December 23, 1889. Serial No. 334,670. (No model.)

*To all whom it may concern:*

Be it known that I, ELIHU THOMSON, a citizen of the United States, and a resident of Lynn, in the county of Essex and State of Massachusetts, have invented certain new and useful Improvements in the Process of Electric Welding, of which the following is a specification.

My present invention relates to improvements in the process of electric welding; and its object is to avoid the production of a burr or expansion at the weld between the two metal pieces joined. In a former patent, No. 347,142, issued to me, as also in my Patent No. 396,011, I have described the application of a hammer to the weld at the completion of the welding operation for giving shape to the parts.

My present invention is an improvement on the prior process of welding and secures a better finished joint.

The invention consists, essentially, in the application of a lateral pressure, hammering or other force, or of other shaping or forming operation to the weld at the point where the lateral burr or expansion tends to form simultaneously with the application to the pieces while heated by the electric current of the end pressure in a way to cause a swelling or lateral bulging of the metal at the proposed joint. The lateral pressure or compressing operation may be performed by means of hammers or dies applied at various points around the joint which is being formed in a direction to compress or confine the metal while it is under pressure for welding, so as to tend to swell the metal at the joint, and while the current is applied which heats the joint up to the welding temperature. In this way as soon as any expansion at the joint begins to take place the hammering or forming apparatus—such as hammers or dies—reciprocating in all directions around the welded metal or metal to be welded, drives back the metal or condenses the stock in such a way as to prevent the metal from actually producing any swell at the joint and at the same time to secure a perfect interweaving or welding at the joint. The electric current may be fed intermittently during this operation for heating the pieces, or it may be continuously applied during the whole operation for keeping the joint or adjoining portions at the welding temperature.

Figure 1:
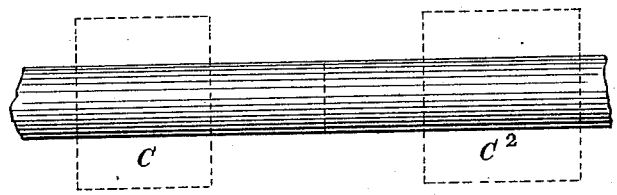
Figure 2:
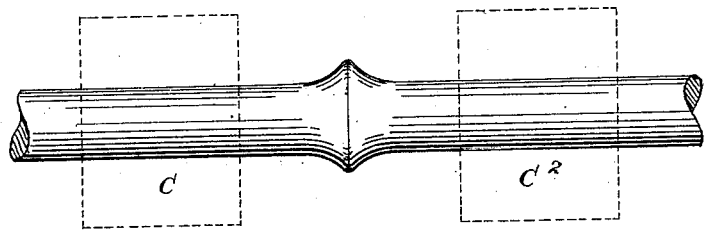
Figure 3:
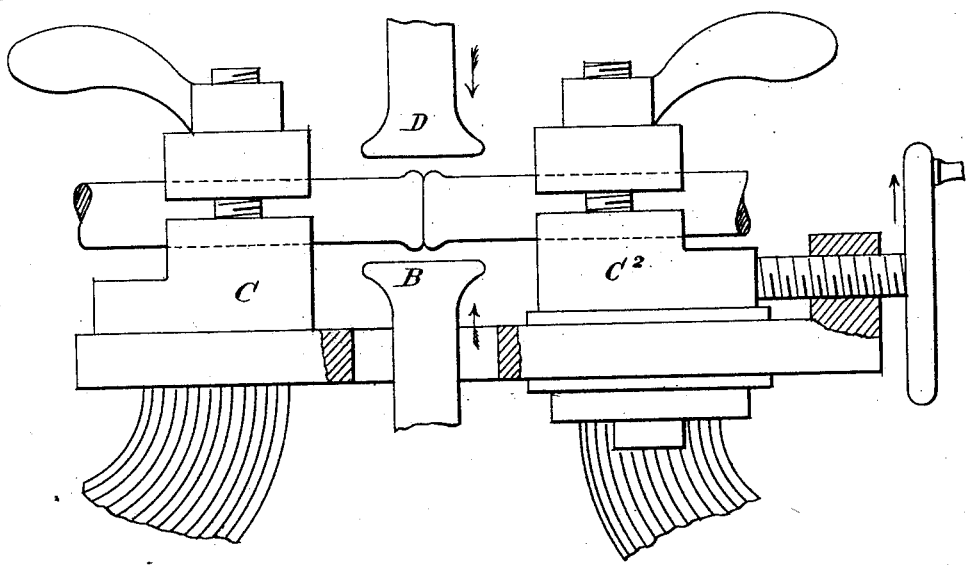

In Figure 1 is shown the appearance of a weld between two pieces such as is made by my process or method, herein described. Fig. 2 shows the appearance of an electric weld made without hammering in which the burr or expansion has been allowed to form. Fig. 3 shows in side elevation a form of apparatus useful in practicing the invention. Fig. 4 shows the application of the invention to pipe-welding. Fig. 5 is a cross-section through a form of apparatus invented by me and adapted to produce pressure or hammering at a number of points simultaneously around the weld. Fig. 6 shows a modified form of apparatus adapted for use in practicing the present invention.

C C² indicates any form of conducting clamps or holders adapted to hold the pieces to be welded and connected in any proper manner with any source of electric current of sufficient volume to heat the pieces at the joint to the temperature required for the welding operation. The clamps are properly mounted so as to be insulated from one another, and one or both are provided with a screw or other device, by which it may be forced toward the other, so as to weld the pieces in the clamps at the joint between when the joint has reached the welding temperature by the heating effect of the current passing through the pieces and across the joint.

The devices for applying pressure simultaneously with the heating and swelling laterally at the weld are shown at D B. They are reciprocating hammers or pressure-dies applied to the metal at the weld, or other devices for reducing or compressing the weld by pressure or impact applied laterally to the swelling metal at the joint, my method being distinguished by the simultaneous application of this compression influence at the same time that the pressure is exerted to move the clamps toward one another during the process of welding by the current.

D might be a hammer and B an anvil, and both may be moved circumferentially around the weld to apply the pressure or impact over the whole weld.

In the welding of pipes over a mandrel the conditions would be as shown in Fig. 4, where M is an inner mandrel to sustain the pipe when acted on by compressing or hammering devices outside the pipe at the joint, the operation being performed, as before, by the pressure lengthwise and simultaneous sidewise hammering or pressure outside during heating by the current. The clamps that hold the pieces may be made to move in any desired direction, as in arcs of circles or in straight lines, one toward the other. The hammers may strike radially or at an angle with the line of the pieces, it being only required that they beat back the material or metal which is tending to swell out at the joint, and thereby complete the weld and also the shaping at the same time. These special devices may be hydraulic dies or such like devices to compress together and form the metal. Thus in Fig. 5, E E E are several dies carried by plungers F F F and arranged to deliver blows or pressure at different points in the circumference of a circle. The plungers may be worked by hydraulic or pneumatic pressure or exhaust operating alternately through the flexible pipes to force the plungers in toward the common center and to permit them to be moved back by external air-pressure. The plungers may work in cylinders in the same frame or casting, so that they may be shifted together circumferentially around the weld, and all of the cylinders may connect with the same pipe P, through which the pressure and exhaust may be applied by a mechanically-driven piston R, as indicated, or in any other manner.

In Fig. 6 the hammer or die S is carried by a piston K, operated by the double action of pressure and exhaust applied simultaneously at opposite sides through the pipes T T, preferably flexible. The alternate exhaust and pressure in said pipes may be produced in obvious fashion by the plunger H, the cylinder of which at opposite sides of the plunger is connected with the pipes. The frame or casting for the cylinder of piston K may carry at one side an anvil or rest L for the work when struck by the hammer or plunger S. The work passes through an opening in the tool, and the tool itself may be made to shift circumferentially around the work. The anvil may be hinged to the body of the tool, so that it may swing back to permit the tool to be applied over the work while in the clamps C C². A suitable set-nut or catch at G holds the anvil in place during operation.

While I generally prefer to apply the lateral compressing or condensing force while the current is continually or intermittently passing, so as to insure the retention of a good heat and welding condition in the metal, I do not limit myself in this respect, and it would be within the broader scope of the invention to take off the electric current at the time of each application of the lateral impact or pressure, provided said impact or pressure be applied before the metal loses its welding temperature and the current be renewed immediately after, so as to keep up or restore the temperature.

The process of forming a junction between sections of pipe, tubing, and other hollow metal objects, consisting in passing a current of electricity across the joint between the sections, heating the joint to the welding-temperature, and completing the welding operation over a mandrel introduced into the pipe or other article beneath the joint, is not claimed herein, but forms the subject of claims in another application for patent filed by me May 1, 1889, No. 309,212, as a division of previously-filed applications.

What I claim as my invention is—

1. The herein-described improvement in electric welding, which consists in applying lateral compressing or condensing force to the weld during the application of the endwise-welding pressure or force, which tends to upset the metal, so as to form a lateral expansion at the joint.

2. The herein-described improvement in electric welding, which consists in abutting the two pieces to be welded, applying an electric current for heating the metals at the joint or intended union, and during the heating and welding of the pieces applying an end pressure to force them together simultaneously with a shaping or compressing lateral impact or pressure by compressing dies or hammers or other means, whereby any expansion at the joint is prevented and the joint is completed at the same time as the welding.

3. The improvement in electric welding of pieces of metal, which consists in heating the same by an electric current passing across the joint, applying end pressure to the joint to tend to upset the pieces, and opposing the tendency to upsetting by lateral pressure or impact applied to the sides at or near the joint, whereby the weld is completed and the shape of the pieces preserved.

Signed at Lynn, in the county of Essex and State of Massachusetts, this 20th day of December, A. D. 1889.

ELIHU THOMSON.

Witnesses:
E. W. RICE, Jr.,
JOHN W. GIBBONEY.